Nov. 9, 1948.
D. McCULLOUGH
2,453,523
BICYCLE GENERATOR REGULATED BY ROTOR TORQUE VARIATIONS
Filed March 24, 1947
2 Sheets-Sheet 1
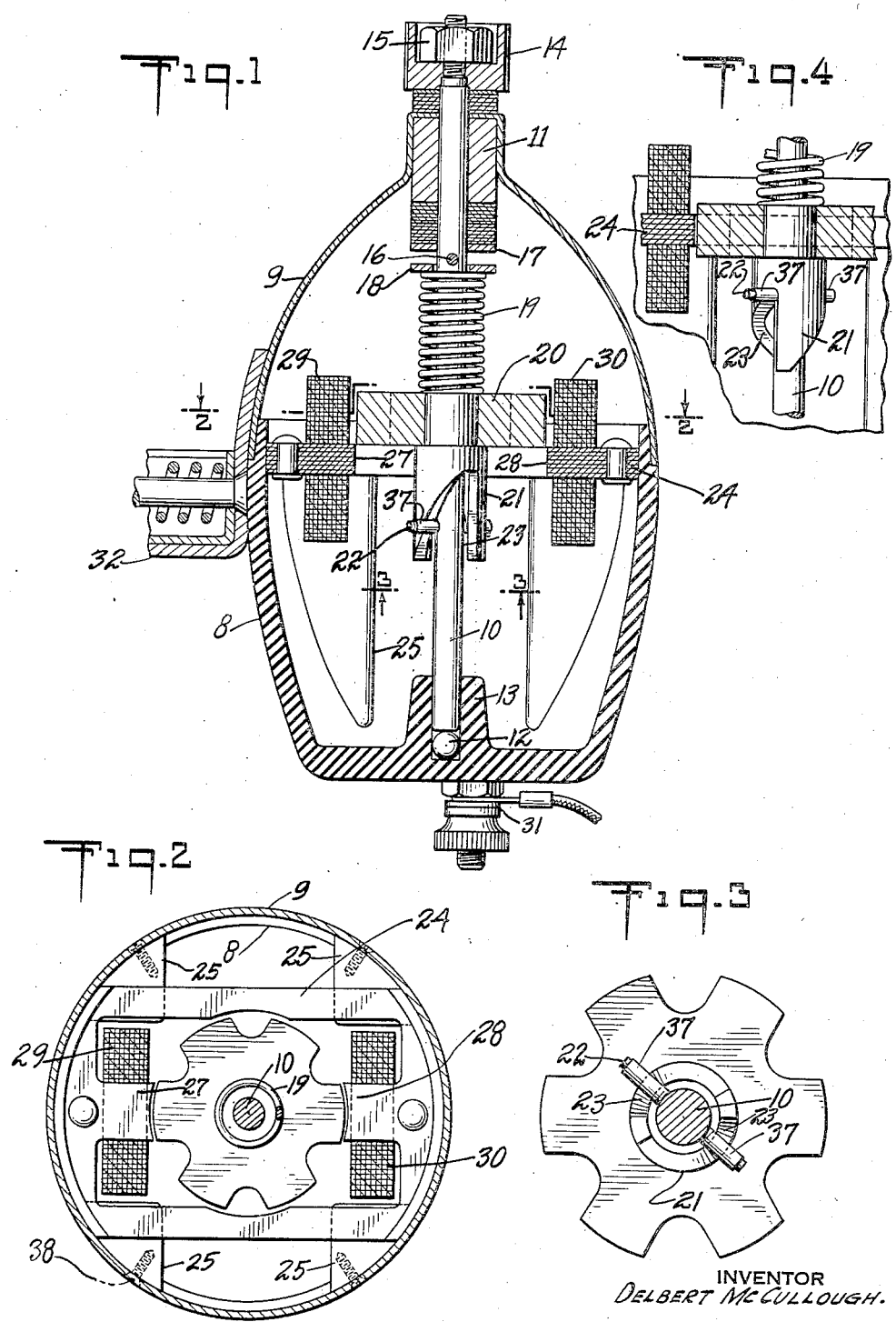
INVENTOR
DELBERT McCULLOUGH.
BY
Emanuel Scheyer
ATTORNEY Nov. 9, 1948.  D. McCULLOUGH  2,453,523
BICYCLE GENERATOR REGULATED
BY ROTOR TORQUE VARIATIONS
Filed March 24, 1947  2 Sheets-Sheet 2
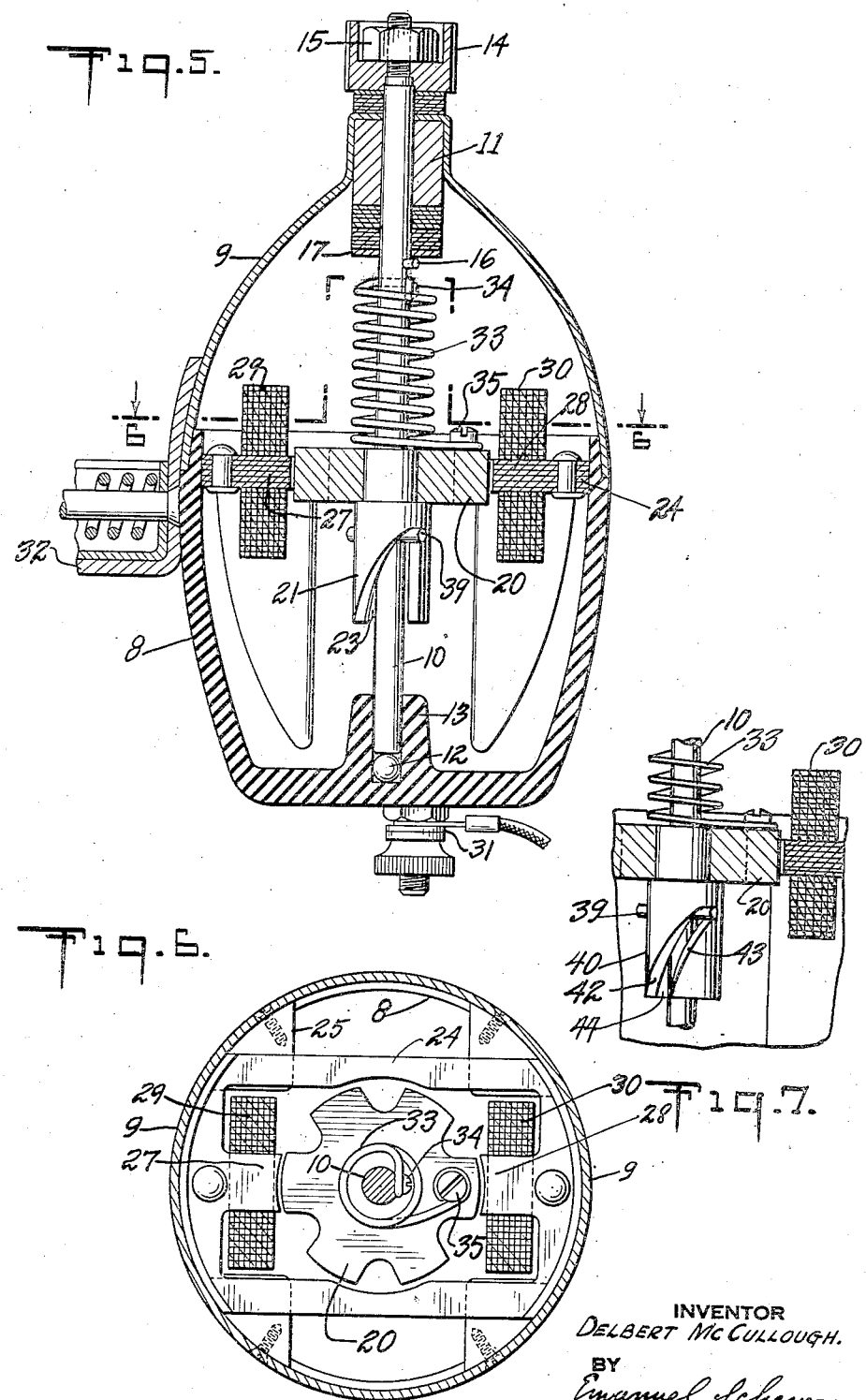
INVENTOR
DELBERT McCULLOUGH.
BY
Emanuel Scheyer
ATTORNEY Patented Nov. 9, 1948

2,453,523

UNITED STATES PATENT OFFICE 2,453,523

BICYCLE GENERATOR REGULATED BY ROTOR TORQUE VARIATIONS

Delbert McCullough, Fairfield, Ill., assignor to Chefford Master Manufacturing Co. Inc., a corporation of Illinois Application March 24, 1947, Serial No. 736,774

6 Claims. (Cl. 171—209)

This invention relates to a generator for a bicycle or other vehicle. Such a device is attached, say to the frame of a bicycle, usually the front fork, and has a friction roller engaging a tire. The rotation of the bicycle wheel, through the medium of the friction roller, rotates the permanent magnet armature of the generator, creating the necessary current to provide a current or currents to operate lights or other devices.

Owing to the fact that the speed of the vehicle is subject to much variation, it is necessary to provide voltage and current regulation for the generator to prevent burning out of the lights or other devices receiving the current. In the prior art, speed governors have been used to shift the permanent magnet armature axially out from between the poles and field coils when the vehicle went beyond a predetermined speed and hence generated a current beyond a predetermined strength.

In the present invention, the torque developed by the armature provides the regulation. As is well known, as the speed increases and a current of greater strength is generated, the torque required to turn the armature of a generator increases accordingly. It is this increase in torque which is used to cause motion of the armature or rotor away from the field windings when said torque is increased beyond a predetermined amount. A decrease in torque, as a result of decrease in speed of the bicycle, effects the return of the armature or rotor toward the stationary field windings. It is these motions which keep the voltage and the current substantially constant when the speed has been increased beyond a predetermined amount.

Other objects and advantages will become apparent upon further study of the description and drawings in which:

Fig. 1 is a section of the generator with a portion of the supporting bracket, the permanent magnet armature being shown removed axially from between the pole pieces and stationary field windings.

Fig. 2 is a section taken along the line 2—2 of Fig. 1 with the supporting bracket omitted.

Fig. 3 is a partial section taken along the line 3—3 of Fig. 1.

Fig. 4 is a fragmental section taken as in Fig. 1 but showing the permanent magnet armature in line with the pole pieces and stationary field windings.

Fig. 5 is a section taken similarly to Fig. 1 except that the rotor is in register with the field windings. The section shows a modified form of generator using a combined torsion and compression spring acting between the driving shaft and the rotor.

Fig. 6 is a section taken along the line 6—6 of Fig. 5, the portion of the supporting bracket being omitted, and Fig. 7 is a partial section showing a modified form of slot with both its sides inclined for use with a combined compression and torsion spring.

The housing of the generator consists of an upper sheet metal shell 9 into which telescopes a lower insulative, preferably plastic casing 8. A rotatably mounted shaft 10 extends axially of the housing. The upper part of shaft 10 is journaled in an anti-friction bushing 11 while its lower end bears against ball 12 set in hollow lug 13. Friction roller 14 is fixedly mounted on the upper end of shaft 10 being held there by nut 15. A pin 16 is set fixedly in a hole in shaft 10. Above pin 16, washer 17 is mounted on said shaft and below said pin is mounted washer 18. A helical spring 19 is set about shaft 10 and compressed between washer 18 and rotor or permanently-magnetized armature 20, holding washer 17 up against bushing 11 and the armature through the intermediacy of cam sleeve 21 against rollers 37 on pin 22. Pin 22 is set fixedly in a hole in shaft 10 and rides with rollers 37 in a pair of cam slots 23 provided in sleeve 21. Rotor 20 and sleeve 21 which are fixed to each other, are slidable on shaft 10.

Laminated field frame 24 is set in recesses formed in the four ribs 25 integral with the inside of plastic casing 8. Screws 38 extend through shell 9 into threaded holes formed in ribs 25 for fastening said shell to casing 8. Pole piece 27 has field coil 29 surrounding it, while pole piece 28 is surrounded by field coil 30. The rotation of armature 20 between pole pieces 27 and 28, as is well known, will generate current in field coils or windings 29 and 30. This current is led off by the grounding of shell 9 to the frame of the bicycle or other supporting frame, not shown, and by a terminal or terminals such as terminal 31 to which the coils are connected. The current generated is used to operate lights, not seen, or for other purposes on a bicycle or other vehicle as discussed in the patents noted below.

The generator as a whole is mounted on a bicycle or the like by means of a bracket 32, shown broken away in Fig. 1. The bracket 32 holds the generator so that friction roller 14 is set to engage a tire of the vehicle and be rotated thereby as shown in Patents Nos. 2,416,833 and 2,088,029. The rotation of shaft 10, and with it rotor 20, by roller 14, effects the generation of current in coils 29 and 30. When shaft 10 rotates it carries pin 22 and rollers 37 around with it. The rotation of shaft 10 is caused to be in such direction that said rollers engage the inclined sides of cam slots 23 of sleeve 21 which is fixed to rotor 20, enabling the latter to rotate with shaft 10 with a lost motion under certain conditions. The lost motion between pin or cam follower 22 and sleeve 21, depending on the direction of the lost motion, causes said sleeve and rotor 20 to slide up or down on shaft 10 in accordance with the inclination of the inclined surface of cam slots 23. Normally spring 19 keeps sleeve 21 down on pin 22 so that the latter nests in the top of cam slots 23.

The amount of current generated depends upon the speed of the bicycle. Regulation of current is required because if the current is suitable for the lighting system at a certain speed of the bicycle it will be too much at a higher speed, tending thereby to burn out the lights or other devices receiving the current. At higher speeds more work must be done in generating the increased current, resulting in greater resistance against turning or increased torque of armature or rotor 20. This increases the pressure between pin 22 and the curved side of cam slots 23 beyond a predetermined normal pressure as determined by the shape of the slot and the strength of spring 19. As the torque increases, sleeve 21 and armature 20 rise on shaft 10 removing said armature from rotating between and in complete register with pole pieces 27 and 28. The farther armature or rotor 20 moves out of register, the less the current generating capacity of the generator. This compensates for increased speed of rotation of said rotor and keeps the current generated of constant strength for substantially all speeds within the range to which the device is subjected. The curvature of the curved side of the cam slot has a smaller radius, the nearer it is to the top of the slot because the decrease in field strength at the poles varies at a higher power than one in accordance with the distance the armature is out of register with field windings 29 and 30. The slope of the inclined side of cam slots 23 becomes more nearly parallel to the direction of the longitudinal axis of shaft 10, the nearer said side is to the open or bottom end of the cam slots, requiring greater torque to produce a given axial motion of rotor 20.

In the modified form of generator shown in Figs. 5 and 6, everything is the same as in the generator of Fig. 1 except that the compression spring 19 of Fig. 1 is replaced by a combined torsion and compression spring 33 and there is no washer 18 to take the thrust of the latter spring. The upper end of the spring 33 is secured to shaft 10 by a screw 34 threaded into the shaft, while the lower end of the spring is fastened to rotor 20 by means of screw 35. Screw 35 is set out a substantial distance from the axis of rotation of rotor 20 to provide a good turning couple or torque.

Spring 33 is provided with a predetermined pressure and torsion so that at a predetermined speed or less of rotation of shaft 10, pin 39 is at the top of cam slots 23 pressing against the top of said slots and pressing against the straight side of the slots. Looking at Fig. 6, torsion spring 33 pulls on rotor 20 to give it a bias to clockwise rotation and at the same time said spring pulls on shaft 10 to give it a bias to counterclockwise rotation. When shaft 10 is rotated faster than the predetermined speed, the increased resistance against turning developed by rotor 20 increases the torsion in spring 20 permitting rotor 20 to lag behind shaft 10 in its rotation. As a result of this, pin 22 presses against the cam-shaped sides of cam slots 23 which owing to their inclination cause rotor 20 to rise on shaft 10 against the compressive force of spring 33 until equilibrium of the contending forces is reached. By rising on shaft 10, rotor 20 is moved out from its maximum position of current production between field windings 29 and 30, said maximum position being shown in Fig. 5. When the excessive speed of shaft 10 is reduced, the compression of spring 33 forces down rotor 20, the torsion of said spring helping to relieve the pressure between pin 22 and the curved side of the cam slots 23 to facilitate the return of rotor 20 to its position in register with field windings 29 and 30. In Fig. 5, a pin 36, through shaft 10, is shown without anti-friction rollers, such as rollers 37 of Figs. 1 and 3, but of course it will be understood that rollers could be used.

In Fig. 7 is shown a modified form of sleeve 21 of Fig. 5, to facilitate the return of rotor 20 to its position between the field windings 29 and 30 when the speed of shaft 10 is reduced to a predetermined rate or less. Rotor 20 has a sleeve 40 fixed to its underside. Sleeve 40 is provided with two diametrally opposed slots 44, only the near one being seen however. The inclined side 42 of the slots is the same as the inclined side of slots 23, Fig. 5, but the other side 43 of slots 44 instead of being parallel to the axis of shaft 10 is at an inclination to the direction of said axis similar to the inclination of side 42. Under these conditions, when the torque required to rotate the rotor becomes equal to or less than the initial torsion in spring 33, pin 39 bears on surface 43 and assists the axial thrust of said spring in returning the rotor to a position between the field windings 29 and 30. So long as the torque required to rotate the rotor exceeds the initial torsion in spring 33, pin 39 presses against surface 42 so that the inclination of surface 43 at that time does not help in returning the rotor to the field windings, the return occurring as in Fig. 5.

Except where inconsistent with the context, the terms relating to position such as upper or lower or above or below as used herein are to be considered merely in a relative sense.

The term "bicycle" as used in the claims is intended to cover other types of variable speed drive as well, where consistent with the context.

I claim:

1. A bicycle generator comprising a shaft, a rotor slidably and rotatably mounted on the shaft, stationary field windings associated with the rotor, a member fixed to the rotor, a part fixed to the shaft, said member having a surface inclined to the axial direction of the shaft and engageable by said part, a spring axially forcing said member against said part and urging the rotor toward the windings, said spring being fixed near one end to the shaft and having its other end mounted in fixed relation to the rotor for torsionally urging said part in a direction away from said inclined surface, the torque required to rotate the rotor faster than a predetermined rate producing, against the torsional urge of the spring means, sufficient pressure between said inclined surface and said part to induce, against the axial force of the spring means, the rotor to slide along the shaft away from said windings.

2. A bicycle generator comprising a shaft, a rotor slidably and rotatably mounted on the shaft, stationary field windings associated with the rotor, a part fixed to the shaft and projecting therefrom, a member fixed to the rotor, said member being provided with a slot containing said part, a side of the slot having a surface inclined to the axial direction of the shaft, a coil spring axially forcing said member against said part and urging the rotor toward said windings, said spring being fixed near one end to the shaft and having its other end mounted in fixed relation to the rotor for torsionally urging said part in a direction away from said side of the slot toward the other side of the slot and effecting pressure against the latter when the torque is that required to rotate the rotor at a predetermined rate or less, the torque required to rotate the rotor faster than said predetermined rate, producing, against the torsional urge of the spring means, sufficient pressure between said inclined surface and said part to induce, against the axial force of the spring means, the rotor to slide up the shaft away from said windings.

3. A bicycle generator comprising a shaft, a rotor slidably and rotatably mounted on the shaft, stationary field windings associated with the rotor, a member fixed to the rotor, a part fixed to the shaft, said member having a pair of surfaces substantially opposite each other and inclined to the axial direction of the shaft, said part being movable between and engageable by said surfaces, a coil spring axially forcing said member against said part and urging the rotor toward said windings, said spring being fixed near one end to the shaft and having its other end mounted in fixed relation to the rotor for torsionally urging said part in a direction away from the first of said surfaces toward the second of said surfaces and effecting pressure against the latter when the torque is that required to rotate the rotor at a predetermined rate or less, said pressure urging the rotor toward the windings, the torque required to rotate the rotor faster than said predetermined rate, producing, against the torsional urge of the spring means, sufficient pressure between said first surface and said part to induce, against the axial force of the spring means, the rotor to slide along the shaft away from said windings.

4. A bicycle generator comprising a shaft, a rotor slidably and rotatably mounted on the shaft, stationary field windings associated with the rotor, a member fixed to rotor and having a slot, the opposite sides of the slot being inclined to the shaft, a part fixed to the shaft and extending therefrom, said part being movable between and engageable by the sides of the slot, a spring axially forcing said member against said part and urging the rotor toward said windings, said spring being fixed near one end to the shaft and having its other end mounted in fixed relation to the rotor for torsionally urging said part in a direction away from the first of said slot sides toward the second of said slot sides and effecting pressure against the latter when the torque is that required to rotate the rotor at a predetermined rate or less, said pressure urging the rotor toward the windings, the torque required to rotate the rotor faster than said predetermined rate, producing, against the torsional urge of the spring means, sufficient pressure between said first side and said part to induce, against the axial force of the spring means, the rotor to slide along the shaft away from said windings.

5. A bicycle generator comprising a shaft, a rotor slidably and rotatably mounted on the shaft, stationary field windings associated with the rotor, a member fixed to the rotor, a part fixed to the shaft, said member having a surface inclined to the axial direction of the shaft and engageable by said part, a torsion spring fixed near one end to the shaft and having its other end mounted in fixed relation to the rotor, said spring being provided with initial torsion urging said part in a direction away from the inclined surface, the torque required to rotate the rotor faster than a predetermined rate overcoming said initial torsion and causing said part to press against said inclined surface, the inclination of the surface being such to effect the sliding of the rotor along the shaft away from said windings.

6. A bicycle generator comprising a shaft, a rotor slidably and rotatably mounted on the shaft, stationary field windings associated with the rotor, a member fixed to the rotor and having a slot, the opposite sides of the slot being inclined to the shaft, a part fixed to the shaft being movable between and engageable with the sides of the slot, a torsion spring fixed near one end to the shaft and having its other end mounted in fixed relation to the rotor, said spring being provided with initial torsion urging said part against one of said inclined surfaces, the inclination of said one surface being such to effect the urging of the rotor toward said windings, the torque required to rotate the rotor faster than a predetermined rate overcoming said initial torsion and causing said part to press against the opposite side of said slot, the inclination of said latter side being such to effect the sliding of the rotor along the shaft away from said windings.

DELBERT McCULLOUGH.

REFERENCES CITED

The following references are of record in the file of this patent:

UNITED STATES PATENTS

| Number | Name | Date |
|---|---|---|
| 1,070,437 | Ferguson | Aug. 19, 1913 |
| 1,131,551 | Price | Mar. 9, 1915 |
| 1,138,286 | Grillet | May 4, 1915 |
| 2,416,833 | Katcher | Mar. 4, 1947 |